C. C. HANSEN.
CHUCK.
APPLICATION FILED FEB. 23, 1909.
1,079,646.
Patented Nov. 25, 1913.
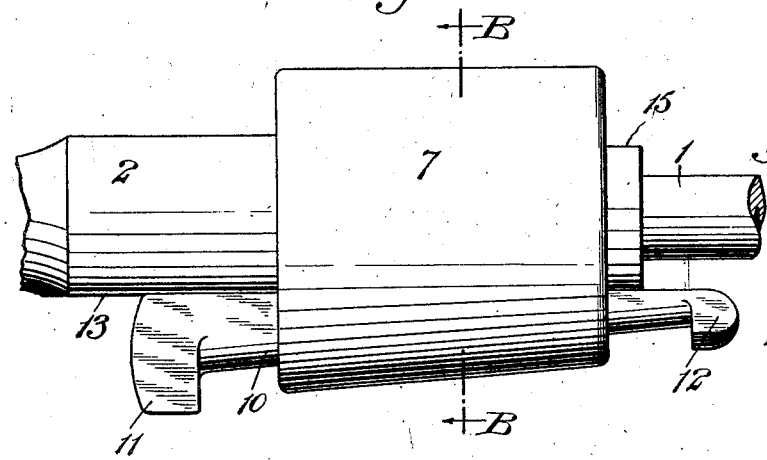
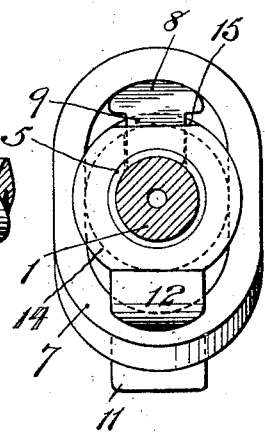
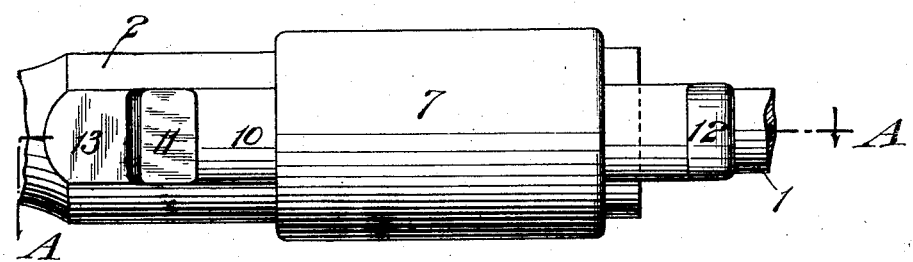
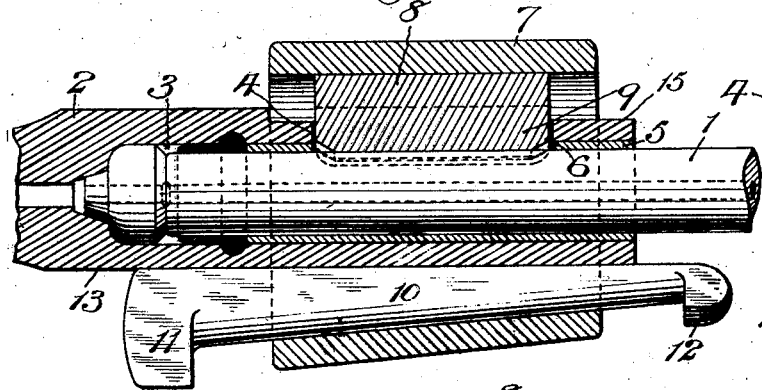
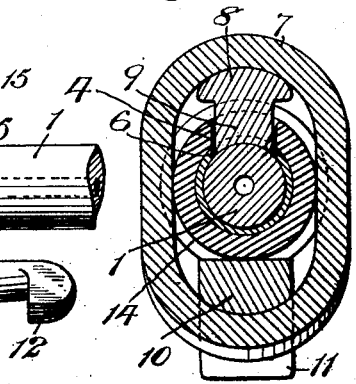
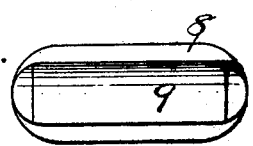

UNITED STATES PATENT OFFICE.

CHARLES C. HANSEN, OF EASTON, PENNSYLVANIA, ASSIGNOR TO INGERSOLL-RAND COMPANY, OF NEW YORK, N. Y., A CORPORATION OF NEW JERSEY.

CHUCK.

1,079,646.  Specification of Letters Patent.  Patented Nov. 25, 1913.

Application filed February 23, 1909. Serial No. 479,325.

*To all whom it may concern:*

Be it known that I, CHARLES C. HANSEN, a citizen of the United States, and resident of Easton, in the county of Northampton and State of Pennsylvania, have invented a new and useful Improvement in Chucks, of which the following is a specification.

This invention relates to an improvement in chucks and more particularly to rock drill chucks and has for its object to provide certain improvements in the construction, form and arrangement of the several parts of the chuck whereby the parts may be brought within a very small compass; this very desirable result being accomplished by locating the clamping shoe and the wedge key upon opposite sides of the chuck within the strap which surrounds the chuck.

In the accompanying drawings, Figure 1 represents a chuck in side-elevation embodying the invention, with a drill steel shown clamped therein, Fig. 2 is an outer end view of the same, Fig. 3 is an inverted plan view, Fig. 4 is a longitudinal central section taken in the plane of the line A—A of Fig. 3, Fig. 5 is a transverse section taken in the plane of the line B—B of Fig. 1, and Fig. 6 is a detail inverted plan view of the clamping shoe.

The drill steel is denoted by 1 and the drill steel receiving chuck by 2. The drill steel receiving socket is denoted by 3 and a longitudinally arranged elongated slot 4 is provided through the wall of the chuck. A hollow bushing 5 is located within the socket 3 of the chuck, which bushing is provided with a longitudinally arranged elongated slot 6 in alinement with the slot 4 in the chuck 2. A strap 7 surrounds the chuck 2, which strap is of elongated form with its side walls engaging the sides of the chuck and its end walls spaced a distance therefrom. A clamping shoe and a wedge-key are located upon opposite sides of the chuck within the said strap 7, the clamping shoe having a head 8 provided with a transversely convexed outer face fitted to the portion of the strap 7 which it engages and a shank 9 having a transversely concaved face fitted to engage the drill steel 1. The reduced portion 9 of this clamping shoe extends through the slots 4 and 6 in the chuck and bushing respectively into engagement with the drill steel 1.

The wedge-key 10 is provided with retaining heads 11 and 12 at its ends and the inner face of this wedge key is flattened to engage the flattened face 13 of the chuck. The outer face of this wedge-key 10 is convexed transversely so as to fit the portion of the strap 7 which it engages. This portion of the strap 7 which is engaged by the wedge key is tapered while the portion that is engaged by the clamping shoe is parallel with the axis of the chuck so that as the wedge-key is driven outwardly along the chuck, it will cause the clamping shoe to be forced against the drill steel by a lateral movement.

The chuck is provided with a circumferential recess 14 forming shoulders between which the strap 7 is retained against longitudinal displacement when in position. The chuck is provided with a flattened face 15 at its outer end opposite the flattened face 13. These flattened faces 13 and 15 are flush with the bottom of the circumferential recess 14 so as to permit the strap 7 to be inserted into position and removed by turning the strap rotatively until its opposite side walls are brought into register with the said flattened faces.

The parts are assembled before the drill steel is inserted into the chuck by first inserting the strap into position, then inserting the clamping shoe and finally inserting the wedge-key.

By locating the clamping shoe and wedge-key upon opposite sides of the chuck, the parts are brought into a very compact relationship and also the chuck is made much stronger because of the balancing of the parts upon both sides of the chuck.

While I have shown this invention as applied to a drill steel chuck, it is evident that it could be applied equally well to chucks and tools of any description.

What I claim is:—

1. A chuck receiving a drill steel, a laterally movable strap surrounding the chuck, a clamping shoe and a wedge key located upon opposite sides of the chuck within said strap, said clamping shoe engaging the steel and strap, and said wedge key engaging the chuck and strap.

2. A chuck for receiving a drill steel, a laterally movable strap surrounding the chuck, a clamping shoe and a wedge key located upon opposite sides of the chuck within said strap, said clamping shoe engaging the steel and said wedge key engaging the chuck, said chuck being provided with shoulders between which the strap is held against longitudinal displacement in both directions.

3. A chuck for receiving a drill steel, an elongated laterally movable strap surrounding the chuck, a clamping shoe and a wedge key located upon opposite sides of the chuck within said strap, said clamping shoe engaging the steel and said strap engaging the chuck, said chuck having a circumferential groove forming shoulders for retaining the strap against longitudinal displacement and oppositely arranged flattened faces intersecting the groove for permitting the insertion and removal of the strap by rotative and longitudinal movements on the chuck.

4. A chuck for receiving a drill steel, an elongated laterally movable strap surrounding the chuck with its side walls engaging the sides of the chuck and its end walls spaced a distance therefrom, a clamping shoe interposed between the drill steel and one end wall of the strap and a wedge key interposed between the chuck and the other end wall of the strap.

In testimony, that I claim the foregoing as my invention, I have signed my name in presence of two witnesses, this 13th day of February 1909.

CHARLES C. HANSEN.

Witnesses:
S. H. PAINTER,
ARTHUR J. SHIMER.